(12) United States Patent
Zhao et al.

(10) Patent No.: US 12,445,338 B2
(45) Date of Patent: Oct. 14, 2025

(54) FREQUENCY OFFSET ESTIMATION METHOD AND APPARATUS, ELECTRONIC DEVICE, AND COMPUTER-READABLE STORAGE MEDIUM

(71) Applicant: SANECHIPS TECHNOLOGY CO., LTD., Guangdong (CN)

(72) Inventors: Lijuan Zhao, Guangdong (CN); Qing Bian, Guangdong (CN)

(73) Assignee: SANECHIPS TECHNOLOGY CO., LTD., Guangdong (CN)

( * ) Notice: Subject to any disclaimer, the term of this patent is extended or adjusted under 35 U.S.C. 154(b) by 87 days.

(21) Appl. No.: 18/692,824

(22) PCT Filed: Mar. 21, 2022

(86) PCT No.: PCT/CN2022/081933
§ 371 (c)(1),
(2) Date: Mar. 17, 2024

(87) PCT Pub. No.: WO2023/040225
PCT Pub. Date: Mar. 23, 2023

(65) Prior Publication Data
US 2024/0372768 A1   Nov. 7, 2024

(30) Foreign Application Priority Data

Sep. 18, 2021   (CN) .......................... 202111112962.2

(51) Int. Cl.
*H04L 27/26* (2006.01)
*H04L 27/00* (2006.01)

(52) U.S. Cl.
CPC ........ *H04L 27/266* (2013.01); *H04L 27/0014* (2013.01); *H04L 2027/0026* (2013.01)

(58) Field of Classification Search
CPC ............... H04L 27/266; H04L 27/0014; H04L 2027/0026
See application file for complete search history.

(56) References Cited

U.S. PATENT DOCUMENTS

| 2017/0187557 A1* | 6/2017 | Zhang | H04L 27/2655 |
| 2017/0331664 A1* | 11/2017 | Cheon | H04L 27/2675 |

(Continued)

FOREIGN PATENT DOCUMENTS

| CN | 108337202 A | 7/2018 |
| CN | 110199506 A | 9/2019 |
| WO | WO 2014116944 A2 | 7/2014 |

OTHER PUBLICATIONS

WIPO, International Search Report issued on Jun. 20, 2022.
(Continued)

*Primary Examiner* — Janice N Tieu
(74) *Attorney, Agent, or Firm* — Li & Cai Intellectual Property (USA) Office

(57) ABSTRACT

There are provided a frequency offset estimation method, a frequency offset estimation apparatus, an electronic device, and a computer-readable storage medium. The frequency offset estimation method includes: adopting a first frequency offset estimation method to perform frequency offset estimation on a demodulation reference signal (DMRS) sent from a terminal, to obtain a first frequency offset estimated value (100); adopting a second frequency offset estimation method to perform frequency offset estimation on the DMRS sent from the terminal, to obtain a second frequency offset estimated value (101); and determining a confidence factor according to the first frequency offset estimated value and the second frequency offset estimated value, and calibrating the second frequency offset estimated value according to the confidence factor to obtain a final frequency offset estimated value (102).

12 Claims, 2 Drawing Sheets

(56) References Cited

U.S. PATENT DOCUMENTS

2022/0210000 A1* 6/2022 Li .................. H04L 5/0051
2022/0385505 A1* 12/2022 Xu .................. H04L 5/0048
2024/0064674 A1* 2/2024 Marcone ............ H04L 27/2657

OTHER PUBLICATIONS

Feng Du, et al., "A Feed-forward Frequency Offset Estimation Algorithm Based on Time and Frequency Domain", Electronic Quality, vol. 5 issued on May 20, 2016.

* cited by examiner

FREQUENCY OFFSET ESTIMATION METHOD AND APPARATUS, ELECTRONIC DEVICE, AND COMPUTER-READABLE STORAGE MEDIUM

CROSS-REFERENCE TO RELATED APPLICATIONS

This application is a National Phase Application filed under 35 U.S.C. 371 as a national stage of PCT/CN2022/081933 filed on Mar. 21, 2022, and claims priority from Chinese patent application No. 202111112962.2 filed on Sep. 18, 2021, the entirety of which is incorporated hereby by reference.

TECHNICAL FIELD

Embodiments of the present application relate to the field of communication technology, and particularly relate to a frequency offset estimation method, a frequency offset estimation apparatus, an electronic device, and a computer-readable storage medium.

BACKGROUND

The vehicle-to-everything (V2X) technology has entered a fast development stage now, in which car networking will establish a new development direction of the vehicle technology by integrating global positioning navigation, communication over V2X, wireless communication and remote sensing, and thus facilitate rapid development of related industries.

The V2X mainly includes four types: vehicle-to-vehicle (V2V), vehicle-to-infrastructure (V2I), vehicle-to-network (V2N), and vehicle-to-pedestrian (V2P). In V2X car networking applications, vehicles move fast, supporting a relative moving speed of about 500 km/h as fastest, an operating frequency band from 5855 MHz to 5925 MHZ, and a Doppler frequency shift of about 2700 Hz as maximum. Considering a maximum carrier frequency offset of about 0.3 ppm, the long term evolution (LTE) and the 5th generation mobile communication technology (5G) new radio (NR) V2X may operate in the frequency band from 5855 MHz to 5925 MHz, with a maximum carrier frequency offset of about 1800 Hz. As can be seen from the above description, a relatively high speed movement and a relatively high carrier frequency band may lead to a maximum frequency offset of about 4500 Hz, which will seriously affect the demodulation performance of the system. Therefore, it is desired to estimate the frequency offset and then compensate for the frequency offset by some specific methods.

There are two related frequency offset estimation methods: adjacent demodulation reference signal (DMRS) frequency domain frequency offset estimation method, and half symbol time domain frequency offset estimation method. The adjacent DMRS frequency domain frequency offset estimation method has a relatively high estimation accuracy, but, in a case where the Doppler frequency shift is relatively large, may cause many problems that an estimated value has a reversal phase due to exceeding an estimation range, so that the estimation performance is rapidly deteriorated: the half symbol time domain frequency offset estimation method, although has a large enough estimation range, is low in accuracy and large in variance, which may cause a certain loss of the demodulation performance. In summary, in an application scenario with a relatively large frequency offset range, the frequency offset estimation methods mentioned above have poor estimation performance.

SUMMARY

In a first aspect, an embodiment of the present application provides a frequency offset estimation method, including: adopting a first frequency offset estimation method to perform frequency offset estimation on a demodulation reference signal (DMRS) sent from a terminal, to obtain a first frequency offset estimated value: adopting a second frequency offset estimation method to perform frequency offset estimation on the DMRS sent from the terminal, to obtain a second frequency offset estimated value: and determining a confidence factor according to the first frequency offset estimated value and the second frequency offset estimated value, and calibrating the second frequency offset estimated value according to the confidence factor to obtain a final frequency offset estimated value.

In a second aspect, an embodiment of the present application provides an electronic device, including: at least one processor: and a memory having at least one computer program stored thereon, the at least one computer program, executed by the at least one processor, causes the at least one processor to implement the frequency offset estimation method as described above.

In a third aspect, an embodiment of the present application provides a computer-readable storage medium having a computer program stored thereon, the computer program, executed by a processor, causes the processor to implement the frequency offset estimation method as described above.

In a fourth aspect, an embodiment of the present application provides a frequency offset estimation apparatus, including: a first frequency offset estimation module configured to adopt a first frequency offset estimation method to perform frequency offset estimation on a demodulation reference signal (DMRS) sent from a terminal, to obtain a first frequency offset estimated value: a second frequency offset estimation module configured to adopt a second frequency offset estimation method to perform frequency offset estimation on the DMRS sent from the terminal, to obtain a second frequency offset estimated value: a confidence factor selection module configured to determine a confidence factor according to the first frequency offset estimated value and the second frequency offset estimated value: and a frequency offset calibration module configured to calibrate the second frequency offset estimated value according to the confidence factor to obtain a final frequency offset estimated value.

DETAIL DESCRIPTION OF EMBODIMENTS

Figure 1:
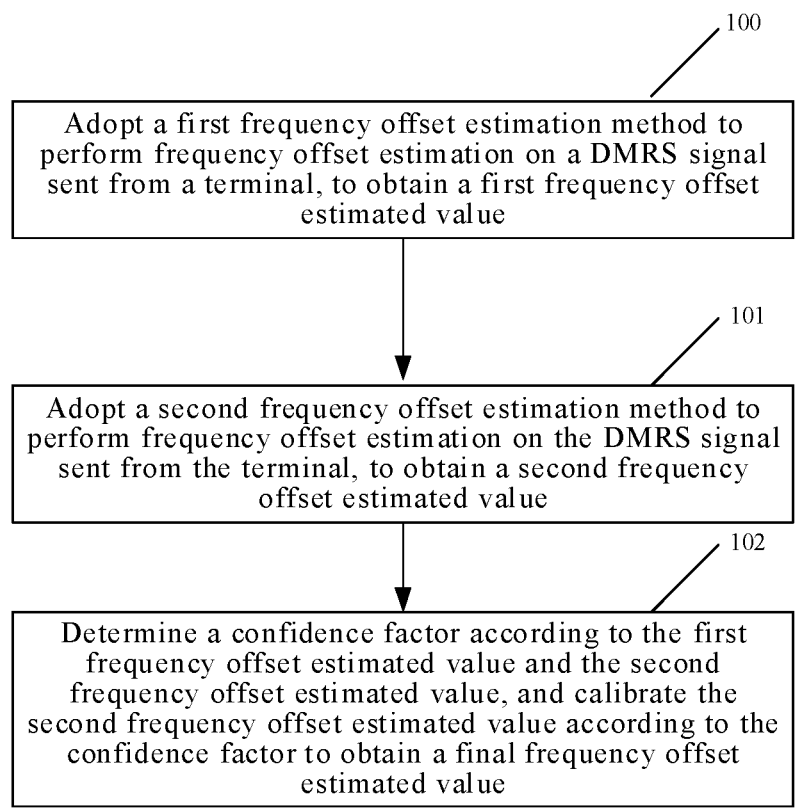
FIG. 1 is a flowchart of a frequency offset estimation method according to an embodiment of the present application.

To improve understanding of the technical solution of the present application for those skilled in the art, the frequency offset estimation method, the frequency offset estimation apparatus, the electronic device, and the computer-readable storage medium according to the present application will be described below in detail in conjunction with the accompanying drawings.

Example embodiments will be described more sufficiently below with reference to the accompanying drawings, but may be embodied in different forms, and the present disclosure should not be construed as limited to the embodiments set forth herein. These embodiments are provided so that the present application will be more thorough and complete, and will fully convey the scope the present application to those skilled in the art.

The embodiments of the present application and features thereof may be combined with each other as long as they are not contradictory.

As used herein, the term "and/or" includes any and all combinations of at least one associated listed item.

The terminology used herein is for the purpose of describing specific embodiments only and is not intended to limit the present application. As used herein, the singular forms "a", "an" and "the" are intended to include the plural forms as well, unless the context clearly indicates otherwise. It will be further understood that as used herein, the terms "comprise/include" and/or "consist/made of . . . " specify the presence of specific features, integers, steps, operations, elements, and/or components, but do not preclude the presence or addition of at least one other feature, integer, step, operation, element, component, and/or group thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present application, and will not be interpreted in an idealized or overly formal sense unless expressly so defined herein.

There are two related frequency offset estimation methods: an adjacent demodulation reference signal (DMRS) frequency domain frequency offset estimation method, and a half symbol time domain frequency offset estimation method.

The adjacent DMRS frequency domain frequency offset estimation method obtains a frequency offset estimated value by calculating a phase change of adjacent symbols of the DMRS. In a long term evolution (LTE) vehicle-to-everything (V2X) scenario, adjacent symbols of the DMRS are spaced by an interval of 3 symbols, and the maximum frequency offset range to be estimated is ±2336 (Hz); and in a 5th generation mobile communication technology (5G) new radio (NR) V2X scenario, adjacent symbols of the DMRS are spaced by an interval of at least 3 symbols and at most 7 symbols, and the maximum frequency offset range to be estimated is ±4672 Hz. The maximum possible frequency offset of V2X is about ±4500 Hz, so that in the LTE V2X scenario, the frequency offset range of V2X may exceed the estimation range of the adjacent DMRS frequency domain frequency offset estimation method, which may cause a phase flip of an estimated value and thus cause that the estimated value has a reversal phase, and in the 5G NR V2X scenario, in consideration of an influence of noise, with the adjacent DMRS frequency domain frequency offset estimation method, a phase flip of an estimated value may also occur, and thus the estimated value may also have a reversal phase.

The half symbol time domain frequency offset estimation method obtains a frequency offset estimated value by calculating a phase angle of a time domain correlated result of a first half symbol and a second half symbol of the signal. This method has a frequency offset estimation range of $\pm\Delta f$ ($\Delta f$ is a subcarrier interval), which is sufficient to cover an extreme scenario of V2X, but the estimation accuracy is poor due to influences of channels and noises, and further, considering service characteristics of V2X, the half symbol time domain frequency offset estimation method cannot implement filtering in time to converge to an accurate value.

In summary, the adjacent DMRS frequency domain frequency offset estimation method has a relatively high estimation accuracy, but, in a case where the Doppler frequency shift is relatively large, may cause many problems that an estimated value has a reversal phase due to exceeding an estimation range, so that the estimation performance is rapidly deteriorated: the half symbol time domain frequency offset estimation method, although has a large enough estimation range, is low in accuracy and large in variance, which may cause a certain loss of the demodulation performance. In summary, in an application scenario with a relatively large frequency offset range, the existing related frequency offset estimation methods have poor estimation performance.

It should be noted that although the frequency offset estimation method in the embodiments of the present application is proposed based on the problems existing in the LTE V2X scenario and the 5G NR V2X scenario, the frequency offset estimation method in the embodiments of the present application may be applied to frequency offset estimation in any other scenario.

Although the frequency offset estimation method in the embodiments of the present application is proposed based on the problems existing in the adjacent DMRS frequency domain frequency offset estimation method and the half symbol time domain frequency offset estimation method, the frequency offset estimation method in the embodiments of the present application is suitable for the situation where a first frequency offset estimation method and a second frequency offset estimation method have the same problems as the foregoing two methods. The first frequency offset estimation method, similar to the adjacent DMRS frequency domain frequency offset estimation method, is a frequency offset estimation method that may cause a phase flip in a case where the amount of Doppler frequency shift is relative large, the second frequency offset estimation method, similar to the half symbol time domain frequency offset estimation method, is a frequency offset estimation method having a relatively large frequency offset estimation range but a relatively low accuracy.

FIG. 1 is a flowchart of a frequency offset estimation method according to an embodiment of the present application.

In a first aspect, referring to FIG. 1, an embodiment of the present application provides a frequency offset estimation method, including the following operations 100 to 102.

At operation 100, adopting a first frequency offset estimation method to perform frequency offset estimation on a DMRS sent from a terminal, to obtain a first frequency offset estimated value.

In some implementations, the first frequency offset estimation method refers to a frequency offset estimation method that may cause a phase flip in a case where the amount of Doppler frequency shift is relative large, such as the adjacent DMRS frequency domain frequency offset estimation method.

In the embodiment of the present application, DMRSs sent from only one terminal may be received, or DMRSs sent from two or more terminals may be received simultaneously. If DMRSs sent from two or more terminals are received simultaneously, the frequency offset estimation is performed on the DMRS sent from each terminal. For example, DMRSs sent from a terminal 1, a terminal 2, and a terminal 3 are received simultaneously, and the frequency offset estimation is performed on the DMRS sent from the terminal 1 by the first frequency offset estimation method to obtain a first frequency offset estimated value 1, the frequency offset estimation is performed on the DMRS sent from the terminal 2 by the first frequency offset estimation method to obtain a first frequency offset estimated value 2, and the frequency offset estimation is performed on the DMRS sent from the terminal 3 by the first frequency offset estimation method to obtain a first frequency offset estimated value 3.

In the embodiment of the present application, one terminal may send one or two or more DMRSs. If one terminal sends two or more DMRSs, during the frequency offset estimation being performed on the DMRSs sent from each terminal, the frequency offset estimation is performed on the DMRSs sent from the same terminal.

The DMRS is not specifically limited in the embodiment of the present application. For example, the DMRS may be a physical sidelink control channel (PSCCH) DMRS, or a physical sidelink shared channel (PSSCH) DMRS.

At operation 101, adopting a second frequency offset estimation method to perform frequency offset estimation on the DMRS sent from the terminal, to obtain a second frequency offset estimated value.

In some implementations, the second frequency offset estimation method refers to a frequency offset estimation method having a relatively large frequency offset estimation range but a relatively low accuracy, such as the half symbol time domain frequency offset estimation method.

In the embodiment of the present application. DMRSs sent from only one terminal may be received, or DMRSs sent from two or more terminals may be received simultaneously. If DMRSs sent from two or more terminals are received simultaneously, the frequency offset estimation is performed on the DMRS sent from each terminal. For example, DMRSs sent from a terminal 1, a terminal 2, and a terminal 3 are received simultaneously, and the frequency offset estimation is performed on the DMRS sent from the terminal 1 by the second frequency offset estimation method to obtain a second frequency offset estimated value 1, the frequency offset estimation is performed on the DMRS sent from the terminal 2 by the second frequency offset estimation method to obtain a second frequency offset estimated value 2, and the frequency offset estimation is performed on the DMRS sent from the terminal 3 by the second frequency offset estimation method to obtain a second frequency offset estimated value 3.

In the embodiment of the present application, one terminal may send one or two or more DMRSs. If one terminal sends two or more DMRSs, during the frequency offset estimation being performed on the DMRSs sent from each terminal, the frequency offset estimation is performed on the DMRSs sent from the same terminal.

At operation 102, determining a confidence factor according to the first frequency offset estimated value and the second frequency offset estimated value, and calibrating the second frequency offset estimated value according to the confidence factor to obtain a final frequency offset estimated value.

In the embodiment of the present application. DMRSs sent from only one terminal may be received, or DMRSs sent from two or more terminals may be received simultaneously. If DMRSs sent from two or more terminals are received simultaneously, the confidence factor is determined according to the first frequency offset estimated value and the second frequency offset estimated value corresponding to each terminal, and the second frequency offset estimated value is calibrated according to the confidence factor to obtain a final frequency offset estimated value. For example, DMRSs sent from a terminal 1, a terminal 2, and a terminal 3 are received simultaneously, and for the terminal 1, a confidence factor 1 is determined according to the first frequency offset estimated value 1 and the second frequency offset estimated value 1, and the second frequency offset estimated value 1 is calibrated according to the confidence factor 1 to obtain a final frequency offset estimated value 1: for the terminal 2, a confidence factor 2 is determined according to the first frequency offset estimated value 2 and the second frequency offset estimated value 2, and the second frequency offset estimated value 2 is calibrated according to the confidence factor 2 to obtain a final frequency offset estimated value 2; and for the terminal 3, a confidence factor 3 is determined according to the first frequency offset estimated value 3 and the second frequency offset estimated value 3, and the second frequency offset estimated value 3 is calibrated according to the confidence factor 3 to obtain a final frequency offset estimated value 3.

In the embodiment of the present application, there may be two cases, i.e., a case with a phase flip and a case without the phase flip, in the frequency offset estimation adopting the first frequency offset estimation method, and the following describes how to determine the confidence factor in these two cases, respectively.

First, in the case of no phase flip occurring in the frequency offset estimation adopting the first frequency offset estimation method, determining the confidence factor according to the first frequency offset estimated value and the second frequency offset estimated value includes: in response to determining that there is no phase flip occurring in the frequency offset estimation adopting the first frequency offset estimation method according to the first frequency offset estimated value and the second frequency offset estimated value, selecting a positive number from a first selectable interval as the confidence factor, the first selectable interval being an interval greater than 0 and less than or equal to 0.5.

In some implementations, as a direct result of the absence of phase flip in the frequency offset estimation adopting the first frequency offset estimation method, the first frequency offset estimated value and the second frequency offset estimated value have the same sign, and thus, whether there is the phase flip occurring in frequency offset estimation adopting the first frequency offset estimation method can be determined according to whether the first frequency offset estimated value and the second frequency offset estimated value have the same sign. Specifically, determining that there is no phase flip in the frequency offset estimation adopting the first frequency offset estimation method according to the first frequency offset estimated value and the second frequency offset estimated value includes: determining that there is no phase flip in the frequency offset estimation adopting the first frequency offset estimation method according to the fact that the first frequency offset estimated value and the second frequency offset estimated value have the same sign.

Second, the case with the phase flip in the frequency offset estimation adopting the first frequency offset estimation method may include two situations, i.e., a situation in which an absolute value of a difference between the first frequency offset estimated value and the second frequency offset estimated value is less than or equal to an adaptive threshold value, and a situation in which the absolute value of the difference between the first frequency offset estimated value and the second frequency offset estimated value is greater than the adaptive threshold value.

For the situation in which the absolute value of the difference between the first frequency offset estimated value and the second frequency offset estimated value is less than or equal to the adaptive threshold value, determining the confidence factor according to the first frequency offset estimated value and the second frequency offset estimated value includes: in response to determining that there is the phase flip in the frequency offset estimation adopting the first frequency offset estimation method according to the first frequency offset estimated value and the second frequency offset estimated value, and the absolute value of the difference between the first frequency offset estimated value and the second frequency offset estimated value is less than or equal to the adaptive threshold value, selecting a positive number from a first selectable interval as the confidence factor, the first selectable interval being an interval greater than 0 and less than or equal to 0.5.

For the situation in which the absolute value of the difference between the first frequency offset estimated value and the second frequency offset estimated value is greater than the adaptive threshold value, determining the confidence factor according to the first frequency offset estimated value and the second frequency offset estimated value includes: in response to determining that there is the phase flip in the frequency offset estimation adopting the first frequency offset estimation method according to the first frequency offset estimated value and the second frequency offset estimated value, and the absolute value of the difference between the first frequency offset estimated value and the second frequency offset estimated value is greater than the adaptive threshold value, selecting a positive number from a second selectable interval as the confidence factor, the second selectable interval being an interval greater than 0.5 and less than or equal to 1.

In some implementations, as a direct result of the presence of phase flip in the frequency offset estimation adopting the first frequency offset estimation method, the first frequency offset estimated value and the second frequency offset estimated value have different signs, and thus, whether there is the phase flip in the frequency offset estimation adopting the first frequency offset estimation method can be determined according to whether the first frequency offset estimated value and the second frequency offset estimated value have the same sign. Specifically, determining that there is the phase flip in the frequency offset estimation adopting the first frequency offset estimation method according to the first frequency offset estimated value and the second frequency offset estimated value includes: determining that there is the phase flip in the frequency offset estimation adopting the first frequency offset estimation method according to the fact that the first frequency offset estimated value and the second frequency offset estimated value have different signs.

In some implementations, the adaptive threshold value is a value selected from an adaptive threshold value selectable interval, which is an interval greater than 0 and less than or equal to a target value, and an absolute value of a difference between the target value and a greatest frequency offset value is less than or equal to a preset threshold.

In some implementations, calibrating the second frequency offset estimated value according to the confidence factor to obtain the final frequency offset estimated value includes: multiplying the confidence factor and the second frequency offset estimated value to obtain the final frequency offset estimated value.

In the frequency offset estimation method provided in the embodiment of the present application, the first frequency offset estimation method and the second frequency offset estimation method are respectively adopted to perform frequency offset estimation on the DMRS sent from the terminal, so as to obtain the first frequency offset estimated value and the second frequency offset estimated value, the confidence factor is determined according to the first frequency offset estimated value and the second frequency offset estimated value, and then, the second frequency offset estimated value is calibrated according to the confidence factor to obtain the final frequency offset estimated value. Therefore, the first frequency offset estimation method and the second frequency offset estimation method are combined with each other for the frequency offset estimation, which not only enables a larger frequency offset range, but also improves the estimation performance.

A specific implementation process of the frequency offset estimation method in the embodiment of the present application is described in detail below by referring to an example, the example is merely for the purpose of visually embodying the implementation process of the frequency offset estimation method in the embodiment of the present application, and is not intended to limit the protection scope of the frequency offset estimation method in the embodiment of the present application.

The example describes the process of frequency offset estimation for a PSCCH in an LTE V2X system with a maximum Doppler frequency shift of 2700 Hz and a carrier frequency offset of 600 Hz for an extended vehicle A model (EVA). Assuming that PSCCH DMRSs are mapped to a second symbol (i.e., $l_0=2$) and a fifth symbol (i.e., $l_1=5$) of a first slot in a subframe, as well as a first symbol (i.e., $l_2=1$) and a fourth symbol (i.e., $l_3=4$) of a second slot in the subframe, then frequency domain reception signals of the received PSCCH DMRSs on a subcarrier k are respectively:

$$R_{l_0}(k) = X_{l_0}(k)H_{l_0}(k)e^{j2\pi ft}, \quad (1)$$

$$R_{l_1}(k) = X_{l_1}(k)H_{l_1}(k)e^{j2\pi f(t+\Delta t)}, \quad (2)$$

$$R_{l_2}(k) = X_{l_2}(k)H_{l_2}(k)e^{j2\pi ft'}, \quad (3)$$

$$R_{l_3}(k) = X_{l_3}(k)H_{l_3}(k)e^{j2f(t'+\Delta t)}, \quad (4)$$

$R_{l_i}(k)(i=0, 1, 2, 3)$ represents the frequency domain reception signal of the PSCCH DMRS corresponding to the symbol $l_i$ on the subcarrier k, $X_{l_i}(k)(i=0, 1, 2, 3)$ represents the frequency do main transmission signal of the PSCCH DMRS corresponding to the symbol $l_i$ on the subcarrier k, $H_{l_i}(k)(i=0, 1, 2, 3)$ represents a channel frequency domain response of the symbol $l_i$, f is a carrier frequency, t is the time corresponding to the second symbol of the first slot, $\Delta t$ in equation (2) is the relative time between the second symbol and the fifth symbol of the first slot, $\Delta t$ in equation (4) is the relative time between the first symbol and the fourth symbol of the second slot, and t' is the time corresponding to the first symbol of the second slot.

In this example, the specific implementation process of performing frequency offset estimation on the PSCCH DMRS by adopting the frequency offset estimation method in the embodiment of the present application includes the following operations S1 to S3.

At S1, adopting the adjacent DMRS frequency domain frequency offset estimation method as a first frequency offset estimation method, to perform frequency offset estimation on DMRSs sent from a same terminal, to obtain a first frequency offset estimated value.

A local PSCCH DMRS $X_{l_i}(k)$ (i=0, 1, 2, 3) is used for descrambling processing on $R_{l_i}(k)$ (i=0, 1, 2, 3) according to equations (5) to (8), to obtain the descrambled signals as follows:

$$\hat{H}_{l_0}(k) = X_{l_0}(k)^* R_{l_0}(k) = H_{l_0}(k) e^{j2\pi ft}, \quad (5)$$

$$\hat{H}_{l_1}(k) = X_{l_1}(k)^* R_{l_1}(k) = H_{l_1}(k) e^{j2\pi f(t+\Delta t)}, \quad (6)$$

$$\hat{H}_{l_2}(k) = X_{l_2}(k)^* R_{l_2}(k) = H_{l_2}(k) e^{j2\pi ft'}, \quad (7)$$

$$\hat{H}_{l_3}(k) = X_{l_3}(k)^* R_{l_3}(k) = H_{l_3}(k) e^{j2\pi f(t'+\Delta t)}, \quad (8)$$

$\hat{H}_{l_i}(k)$ (i=0, 1, 2, 3) represents a descrambled signal corresponding to the symbol $l_i$.

The descrambled signals $\hat{H}_{l_i}(k)$ of adjacent DMRS symbols are multiplied in a conjugate manner according to following equations (9) and (10):

$$\hat{H}_{l_1}(k) \cdot \hat{H}_{l_0}(k)^* = H_{l_1}(k) H_{l_0}(k)^* e^{j2\pi f \Delta t}, \quad (9)$$

$$\hat{H}_{l_3}(k) \cdot \hat{H}_{l_2}(k)^* = H_{l_3}(k) H_{l_2}(k)^* e^{j2\pi f \Delta t}. \quad (10)$$

Assuming $H_{l_1}(k) \approx H_{l_0}(k) \approx H_{l_3}(k) \approx H_{l_2}(k)$, results obtained by a conjugate multiplication of all DMRS subcarriers are accumulated, and a phase angle is calculated, to obtain a first frequency offset estimated value $\hat{f}_1$, as shown in equation (11):

$$\hat{f}_1 = \frac{\angle\left(\sum_{k=0}^{K-1} \hat{H}_{l_1}(k) \cdot \hat{H}_{l_0}(k)^* + \sum_{k=0}^{K-1} \hat{H}_{l_3}(k) \cdot \hat{H}_{l_2}(k)^*\right)}{2\pi \Delta t}, \quad (11)$$

K is the number of DMRS subcarriers in one symbol, $\angle$ indicates calculating the phase angle, and * indicates calculating a conjugate result.

During the results obtained by the conjugate multiplication of all DMRS subcarriers being accumulated, a coherent accumulation method, as shown in equation (11), or a non-coherent accumulation method, such as accumulating real parts or amplitudes, may be used.

At S2, adopting the half symbol time domain frequency offset estimation as a second frequency offset estimation method, to perform frequency offset estimation on DMRSs sent from the same terminal, to obtain a second frequency offset estimated value.

The frequency domain reception signal $R_{l_i}$ of the received DMRS is transformed into a time domain signal $r_{l_i}(n)$ through N-point inverse discrete Fourier transform (IDFT) or inverse fast Fourier transform (IFFT), as shown in following equation (12):

$$r_{l_i}(n) = IFFT(R_{l_i}), \, i = 0, 1, 2, 3, \, n = 0, 1, \ldots N-1. \quad (12)$$

A frequency domain signal $X_{l_i}$ of a local DMRS is transformed into a time domain signal $x_{l_i}(n)$ through N-point IDFT or IFFT, as shown in following equation (13):

$$x_{l_i}(n) = IFFT(X_{l_i}), \, i = 0, 1, 2, 3, \, n = 0, 1 \ldots N-1. \quad (13)$$

A time offset estimation is performed on the time domain signal $x_{l_i}(n)$ of the local DMRS to obtain an offset d, and then a time offset adjustment is performed on the time domain signal $x_{l_i}(n)$ of the local DMRS, as shown in following equation (14):

$$\bar{x}_{l_i}(n) = x_{l_i}(\text{mod}(n-d, N)). \quad (14)$$

A time domain related processing is performed on a first half symbol and a second half symbol of the signal $\bar{x}_{l_i}(n)$ subjected to the time offset adjustment, as shown in following equation (15):

$$z_{l_i} = \left(\sum_{n=0}^{\frac{N}{2}-1} r_{l_i}(n) \cdot \bar{x}_{l_i}(n)^*\right)^* \cdot \left(\sum_{n=0}^{\frac{N}{2}-1} r_{l_i}\left(n+\frac{N}{2}\right) \cdot \bar{x}_{l_i}\left(n+\frac{N}{2}\right)^*\right). \quad (15)$$

The time domain related results $Z_{l_i}$ of four DMRS symbols are accumulated to calculate a phase angle, so as to obtain a second frequency offset estimated value $\hat{f}_2$, as shown in following equation (16):

$$\hat{f}_2 = \frac{1}{2\pi \Delta t} \angle\left(\sum_{i=0}^{3} z_{l_i}\right). \quad (16)$$

During the time domain related results $Z_{l_i}$ of the DMRS symbols being accumulated, a coherent accumulation method, as shown in the equation (16), or a non-coherent accumulation method, such as accumulating real parts or amplitudes, may be used.

At S3, determining a confidence factor according to the first frequency offset estimated value and the second frequency offset estimated value, and calibrating the second frequency offset estimated value according to the confidence factor to obtain a final frequency offset estimated value.

In a case where $\hat{f}_1$ and $\hat{f}_2$ have the same sign, the confidence factor is 0.5; in a case where $\hat{f}_1$ and $\hat{f}_2$ have different signs and $|\hat{f}_1 - \hat{f}_2|$ is less than or equal to an adaptive threshold value, the confidence factor is 0.5; and in a case where $\hat{f}_1$ and $\hat{f}_2$ have different signs and $|\hat{f}_1 - \hat{f}_2|$ is greater than the adaptive threshold value, the confidence factor is 0.75.

The adaptive threshold value may be set to 2000 Hz.

The confidence factor is multiplied by $\hat{f}_2$ to obtain the final frequency offset estimated value.

According to the frequency offset estimation method in the embodiment of the present application, the confidence factor may be set to 0.75, and in terms of the PSCCH demodulation performance, the signal-to-noise ratio at a block error ratio (BLER) of 1% is improved by about 0.8 dB compared with the method without the calibration, and improved by about 0.5 dB compared with the method of taking the confidence factor of 0.5. Therefore, the frequency offset estimation method in the embodiment of the present application can improve the performance for the frequency offset estimation.

Figure 2:
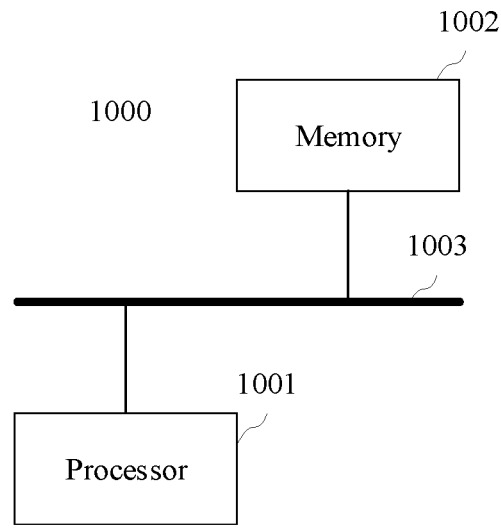
FIG. 2 is a block diagram of an electronic device according to an embodiment of the present application.

In a second aspect, an embodiment of the present application provides an electronic device 1000, and as shown in FIG. 2, the electronic device 1000 includes: at least one processor 1001; and a memory 1002 having at least one computer program stored thereon, at least one computer program, executed by the at least one processor 1001, causes the at least one processor 1001 to implement the frequency offset estimation method as described above.

The processor is a device with a data processing capability, including but not limited to, a central processing unit (CPU), or the like: and the memory is a device with a data storage capability, including but not limited to, a random access memory (RAM, more specifically SDRAM, DDR, etc.), a read only memory (ROM), an electrically erasable programmable read only memory (EEPROM) or a flash.

In some implementations, the processor 1001 and the memory 1002 are connected to each other via a bus 1003, and are further connected to other components of a computing device.

In a third aspect, an embodiment of the present application provides a computer-readable storage medium having a computer program stored thereon, the computer program, executed by a processor, causes the processor to implement the frequency offset estimation method as described above.

Figure 3:
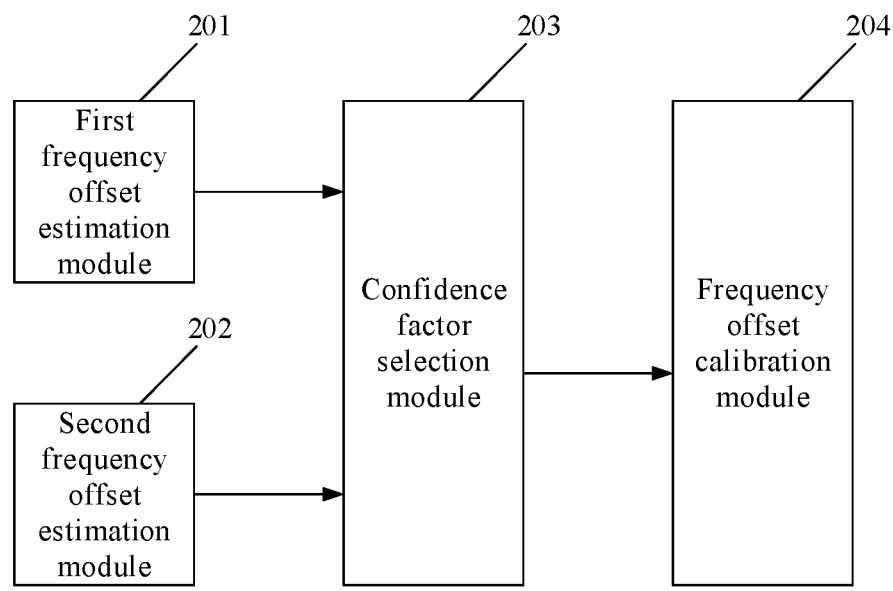
FIG. 3 is a block diagram of a frequency offset estimation apparatus according to an embodiment of the present application.

FIG. 3 is a block diagram of a frequency offset estimation apparatus according to an embodiment of the present application.

In a fourth aspect, an embodiment of the present application provides a frequency offset estimation apparatus, including a first frequency offset estimation module 201, a second frequency offset estimation module 202, a confidence factor selection module 203, and a frequency offset calibration module 204.

The first frequency offset estimation module 201 is configured to adopt a first frequency offset estimation method to perform frequency offset estimation on the DMRS sent from a terminal, to obtain a first frequency offset estimated value. The second frequency offset estimation module 202 is configured to adopt a second frequency offset estimation method to perform frequency offset estimation on the DMRS sent from the terminal, to obtain a second frequency offset estimated value. The confidence factor selection module 203 is configured to determine a confidence factor according to the first frequency offset estimated value and the second frequency offset estimated value: The frequency offset calibration module 204 is configured to calibrate the second frequency offset estimated value according to the confidence factor to obtain a final frequency offset estimated value.

In some implementations, the confidence factor selection module 203 is specifically configured to, in response to determining that there is no phase flip in the frequency offset estimation adopting the first frequency offset estimation method according to the first frequency offset estimated value and the second frequency offset estimated value, select a positive number from a first selectable interval as the confidence factor, the first selectable interval being an interval greater than 0 and less than or equal to 0.5.

In some implementations, the confidence factor selection module 203 is specifically configured to determine that there is no phase flip in the frequency offset estimation adopting the first frequency offset estimation method according to the first frequency offset estimated value and the second frequency offset estimated value by: determining that there is no phase flip in the frequency offset estimation adopting the first frequency offset estimation method according to the fact that the first frequency offset estimated value and the second frequency offset estimated value have the same sign.

In some implementations, the confidence factor selection module 203 is specifically configured to: in response to determining that there is a phase flip in the frequency offset estimation adopting the first frequency offset estimation method according to the first frequency offset estimated value and the second frequency offset estimated value, and an absolute value of a difference between the first frequency offset estimated value and the second frequency offset estimated value is less than or equal to an adaptive threshold value, select a positive number from a first selectable interval as the confidence factor, the first selectable interval being an interval greater than 0 and less than or equal to 0.5.

In some implementations, the confidence factor selection module 203 is specifically configured to determine the confidence factor according to the first frequency offset estimated value and the second frequency offset estimated value by: in response to determining that there is the phase flip in the frequency offset estimation adopting the first frequency offset estimation method according to the first frequency offset estimated value and the second frequency offset estimated value, and the absolute value of the difference between the first frequency offset estimated value and the second frequency offset estimated value is greater than the adaptive threshold value, selecting a positive number from a second selectable interval as the confidence factor, the second selectable interval being an interval greater than 0.5 and less than or equal to 1.

In some implementations, the confidence factor selection module 203 is specifically configured to determine that there is the phase flip in the frequency offset estimation adopting the first frequency offset estimation method according to the first frequency offset estimated value and the second frequency offset estimated value by: determining that there is the phase flip in the frequency offset estimation adopting the first frequency offset estimation method according to the fact that the first frequency offset estimated value and the second frequency offset estimated value have different signs.

In some implementations, the adaptive threshold value is a value selected from an adaptive threshold value selectable interval, which is an interval greater than 0 and less than or equal to a target value, and an absolute value of a difference between the target value and a greatest frequency offset value is less than or equal to a preset threshold.

In some implementations, the frequency offset calibration module 204 is specifically configured to: multiply the confidence factor and the second frequency offset estimated value to obtain the final frequency offset estimated value.

The specific implementation process of the frequency offset estimation apparatus is similar to that of the frequency offset estimation method in the foregoing embodiment, and thus is not repeated here.

Those of ordinary skill in the art will appreciate that all or some operations of the above described method, functional modules/units in the apparatus may be implemented as software, firmware, hardware, and suitable combinations thereof. In a hardware implementation, the division between the functional modules/units mentioned in the above description does not necessarily correspond to the division of physical components: for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. The computer storage medium includes, but is not limited to, an RAM, an ROM, an EEPROM, a flash or any other memory technology, a CD-ROM, a digital versatile disk (DVD) or any other optical disk storage, a magnetic cartridge, a magnetic tape, a magnetic disk storage or any other magnetic memories, or may be any other medium used for storing the desired information and accessible by a computer. Moreover, it is well known to those ordinary skilled in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted merely in a generic and descriptive sense, not for purposes of limitation. In some instances, features, characteristics and/or elements described in connection with a particular embodiment may be used alone, or may be used in combination with features, characteristics and/or elements described in connection with other embodiments, unless expressly stated otherwise, as would be apparent to one skilled in the art. It will, therefore, be understood by those skilled in the art that various changes in form and details may be made without departing from the scope of the present application as set forth in the appended claims.

What is claimed is:

1. A frequency offset estimation method, comprising:
    adopting a first frequency offset estimation method to perform frequency offset estimation on a demodulation reference signal (DMRS) sent from a terminal, to obtain a first frequency offset estimated value;
    adopting a second frequency offset estimation method to perform frequency offset estimation on the DMRS sent from the terminal, to obtain a second frequency offset estimated value; and
    determining a confidence factor according to the first frequency offset estimated value and the second frequency offset estimated value, and calibrating the second frequency offset estimated value according to the confidence factor to obtain a final frequency offset estimated value.

2. The method according to claim 1, wherein determining the confidence factor according to the first frequency offset estimated value and the second frequency offset estimated value comprises:
    in response to determining that there is no phase flip in frequency offset estimation adopting the first frequency offset estimation method according to the first frequency offset estimated value and the second frequency offset estimated value, selecting a positive number from a first selectable interval as the confidence factor, wherein the first selectable interval is an interval greater than 0 and less than or equal to 0.5.

3. The method according to claim 2, wherein determining that there is no phase flip in the frequency offset estimation adopting the first frequency offset estimation method according to the first frequency offset estimated value and the second frequency offset estimated value comprises:
    determining that there is no phase flip in the frequency offset estimation adopting the first frequency offset estimation method according to a fact that the first frequency offset estimated value and the second frequency offset estimated value have a same sign.

4. The method according to claim 1, wherein determining the confidence factor according to the first frequency offset estimated value and the second frequency offset estimated value comprises:
    in response to determining that there is a phase flip in the frequency offset estimation adopting the first frequency offset estimation method according to the first frequency offset estimated value and the second frequency offset estimated value, and an absolute value of a difference between the first frequency offset estimated value and the second frequency offset estimated value is less than or equal to an adaptive threshold value, selecting a positive number from a first selectable interval as the confidence factor, wherein the first selectable interval is an interval greater than 0 and less than or equal to 0.5.

5. The method according to claim 4, wherein determining that there is a phase flip in the frequency offset estimation adopting the first frequency offset estimation method according to the first frequency offset estimated value and the second frequency offset estimated value comprises:
    determining that there is the phase flip in the frequency offset estimation adopting the first frequency offset estimation method according to a fact that the first frequency offset estimated value and the second frequency offset estimated value have different signs.

6. The method according to claim 4, wherein the adaptive threshold value is a value selected from an adaptive threshold value selectable interval, which is an interval greater than 0 and less than or equal to a target value, and an absolute value of a difference between the target value and a greatest frequency offset value is less than or equal to a preset threshold.

7. The method according to claim 1, wherein determining the confidence factor according to the first frequency offset estimated value and the second frequency offset estimated value comprises:
    in response to determining that there is a phase flip in the frequency offset estimation adopting the first frequency offset estimation method according to the first frequency offset estimated value and the second frequency offset estimated value, and an absolute value of a difference between the first frequency offset estimated value and the second frequency offset estimated value is greater than an adaptive threshold value, selecting a positive number from a second selectable interval as the confidence factor, wherein the second selectable interval is an interval greater than 0.5 and less than or equal to 1.

8. The method according to claim 7, wherein determining that there is a phase flip in the frequency offset estimation adopting the first frequency offset estimation method according to the first frequency offset estimated value and the second frequency offset estimated value comprises:
    determining that there is the phase flip in the frequency offset estimation adopting the first frequency offset estimation method according to a fact that the first frequency offset estimated value and the second frequency offset estimated value have different signs.

9. The method according to claim 7, wherein the adaptive threshold value is a value selected from an adaptive threshold value selectable interval, which is an interval greater than 0 and less than or equal to a target value, and an absolute value of a difference between the target value and a greatest frequency offset value is less than or equal to a preset threshold.

10. The method according to claim 1, wherein calibrating the second frequency offset estimated value according to the confidence factor to obtain the final frequency offset estimated value comprises:

multiplying the confidence factor and the second frequency offset estimated value to obtain the final frequency offset estimated value.

11. An electronic device, comprising:

at least one processor; and a memory having at least one computer program stored thereon, the at least one computer program, executed by the at least one processor, causes the at least one processor to implement;

adopting a first frequency offset estimation method to perform frequency offset estimation on a demodulation reference signal (DMRS) sent from a terminal, to obtain a first frequency offset estimated value;

adopting a second frequency offset estimation method to perform frequency offset estimation on the DMRS sent from the terminal, to obtain a second frequency offset estimated value; and determining a confidence factor according to the first frequency offset estimated value and the second frequency offset estimated value, and calibrating the second frequency offset estimated value according to the confidence factor to obtain a final frequency offset estimated value.

12. A non-transitory computer-readable storage medium having a computer program stored thereon, the computer program, executed by a processor, causes the processor to implement;

adopting a first frequency offset estimation method to perform frequency offset estimation on a demodulation reference signal (DMRS) sent from a terminal, to obtain a first frequency offset estimated value;

adopting a second frequency offset estimation method to perform frequency offset estimation on the DMRS sent from the terminal, to obtain a second frequency offset estimated value; and determining a confidence factor according to the first frequency offset estimated value and the second frequency offset estimated value, and calibrating the second frequency offset estimated value according to the confidence factor to obtain a final frequency offset estimated value.

* * * * *